(12) United States Patent
Clarke (10) Patent No.: US 11,536,618 B2
(45) Date of Patent: Dec. 27, 2022

(54) EXTERNAL TIE-ROD LOAD INDICATOR

(71) Applicant: Ronald C. Clarke, Phoenix, AZ (US)

(72) Inventor: Ronald C. Clarke, Phoenix, AZ (US)

(73) Assignee: Valley Forge & Bolt Mfg. Co., Phoenix, AZ (US)

( * ) Notice: Subject to any disclaimer, the term of this patent is extended or adjusted under 35 U.S.C. 154(b) by 411 days.

(21) Appl. No.: 16/792,004

(22) Filed: Feb. 14, 2020

(65) Prior Publication Data

US 2020/0264057 A1 Aug. 20, 2020

Related U.S. Application Data

(60) Provisional application No. 62/806,062, filed on Feb. 15, 2019.

(51) Int. Cl.
  *G01L 1/04* (2006.01)
  *G08C 17/00* (2006.01)
  *F16B 31/02* (2006.01)

(52) U.S. Cl.
  CPC .............. *G01L 1/04* (2013.01); *F16B 31/025* (2013.01); *G08C 17/00* (2013.01)

(58) Field of Classification Search
  None
  See application file for complete search history.

(56) References Cited

U.S. PATENT DOCUMENTS

| 5,808,904 | A | * | 9/1998 | Rasmussen | ........... G01L 5/0076 |
| | | | | | 702/42 |
| 5,809,100 | A | * | 9/1998 | Butler | ..................... G21C 17/00 |
| | | | | | 376/258 |
| 8,337,128 | B2 | | 12/2012 | Clarke | |
| 8,646,162 | B2 | | 2/2014 | Clarke | |
| 2015/0167662 | A1 | * | 6/2015 | Hatch | ..................... G01L 1/246 |
| | | | | | 417/63 |

FOREIGN PATENT DOCUMENTS

| DE | 102007003562 A1 | * | 8/2008 | ............. G01L 23/18 |
| EP | 2072983 A1 | * | 6/2009 | ........... G01L 1/2287 |
| WO | WO-2006087936 A1 | * | 8/2006 | ............... G01B 7/18 |

* cited by examiner

*Primary Examiner* — Peter J Macchiarolo
*Assistant Examiner* — Jermaine L Jenkins
(74) *Attorney, Agent, or Firm* — Kirk Dorius; Dorius Law P.C.

(57) ABSTRACT

A load indicator apparatus which is compact, portable and detachably mounted on the tie-rod. The load indicator apparatus includes a first reference fixture configured for attachment at a first position on the tie-rod, a second fixture configured for attachment at a second position on the tie-rod and an elongation gauge extending between the first reference fixture and the second fixture and configured to measure displacement of the second fixture relative to the first reference fixture during elongation of the tie-rod. A displacement transducer is connected to the second fixture to measure a capacitance value proportional to the loading acting on the tie-rod and transfers it to a load monitoring unit which translates the measured capacitance into a visual load reading and an electronic load output value.

19 Claims, 5 Drawing Sheets

EXTERNAL TIE-ROD LOAD INDICATOR

CROSS REFERENCE TO RELATED APPLICATIONS

This application claims priority to U.S. Provisional Application Ser. No. 62/806,062 filed on Feb. 15, 2019, which is incorporated herein by reference.

FIELD OF THE INVENTION

This invention generally relates to load indicating, and more particularly, to externally measuring and visually representing the loading acting on tie-rods.

BACKGROUND OF THE INVENTION

Monitoring the load on support elements used in various installations, devices, and apparatuses by load calculating devices is an effective measure to ascertain the safe and proper working of such support elements. Determining permissible loading capacity of support elements is also an important industrial process. The estimation of the load-carrying capacity of any support structure significantly impacts its industrial and commercial value. Thus, load calculating devices are useful to provide precise and accurate determination of loads acting on support elements.

Tie-rods are slender support elements consisting of a rod capable of carrying tensile load of the structure to which it is attached. Tie-rods may be found in airplane structures, steel structures such as bridges, industrial buildings, tanks, towers, and cranes. Tie-rods are also used in automobiles as a part of the steering systems. Determining the tensile loading capacity and operational load on a tie-rod is desirable for informing designs, avoiding failure and hazardous damages to the tie-rods and various incorporating structures.

Existing methods for measuring the tensile load of tie-rod are complex in operation and are difficult to use in external environments after a tie-rod has been installed on a structure. Such methods often require costly tools or readers employing electronic or ultrasonic methods requiring special training, experienced operators, expensive equipment, clean surfaces and records of pre-installation test values.

There exists a need for a tie-rod load indicator apparatus and method which is inexpensive, easy to mount and can be used for different rod diameters. The load indicator apparatus should be portable, compact, user-friendly and accurate. Accordingly, improvements are sought in the monitoring of loading in tie-rods and in overcoming the limitations of known devices.

BRIEF SUMMARY OF THE INVENTION

Set forth below is a brief summary of the invention, which achieves the foregoing and other objects and advantages in accordance with the structure, function and results of the present invention as embodied and broadly described herein. Applicant's invention includes independently the apparatus and the methods described herein and claims are directed to both formats even though applicant may describe various aspects and features of the invention in terms of an apparatus or method.

One aspect of the invention features, in some embodiments, a load indicator apparatus for externally measuring the load characteristics of a tie-rod wherein the tie-rod is either installed in a load-bearing structure or otherwise loaded in an industrial/maintenance application.

In some embodiments, a load indicator apparatus comprises a first reference fixture configured for attachment at a first position on a tie-rod, a second fixture configured for attachment at a second position on the tie-rod and an elongation gauge extending between the first reference fixture and the second fixture and configured to measure displacement of the second fixture relative to the first reference fixture during elongation of the tie-rod.

In some embodiments, the load indicator apparatus includes a calibrator configured for calibrating the elongation gauge to an initial load setting corresponding to an initial tie-rod load. In some embodiments, the calibrator is used to initialize the load-indicator to a zero-load baseline. In some embodiments, the calibrator is used to initialize the load-indicator to a non-zero-load baseline.

It some embodiments, the calibrator comprises of a thumb screw extending from the first reference fixture and moveable into contact with the elongation gauge.

In some embodiments, the elongation gauge is spring loaded to maintain contact with the thumb screw over a predetermined range of tie-rod elongation.

Another aspect of the invention features, in some embodiments, a method for measuring loading of a tie-rod. The method includes affixing a first reference fixture at a first position on the tie-rod, affixing a second fixture at a second position on the tie-rod and calibrating the elongation gauge extending between the first reference fixture and the second fixture. The method includes using the elongation gauge to measure displacement of the second fixture relative to the first reference fixture as a measure of loading of the tie-rod.

In some embodiments, a displacement transducer is used to measure the loading on the tie-rod by measuring the capacitance of an air gap formed between the top surface of an elongation pin and a gauge reference surface.

In some embodiments, a reader is used for translating a measured capacitance into at least one of a visual load reading and an electronic load output value.

In some embodiments, a wireless transponder is used for communicating the electronic load output value to a remote receiver.

It is another object of the present invention to provide a load indicator apparatus that is compact and provides precise measurements of the load acting on the tie-rod.

It is yet another object of the present invention to provide a load indicator apparatus wherein the initial installation of the load indicating apparatus is easy and can be done quickly by the user.

It is yet another object of the present invention to provide a load indicator apparatus wherein the number of components involved in the load indicating apparatus are portable, lightweight and adaptable to different industrial applications and environments.

In some embodiments, measurements detected by the load indicator apparatus can be used to shut-off a tightening tool applying load on the tie-rod when the load on the tie-rod reaches a predetermined threshold.

In some embodiments, the load indicator apparatus of the present invention also makes it possible to monitor the real-time loading of the tie-rod.

In some embodiments, the readings from the load indicator apparatus can be integrated into a software system for automatically providing notifications to maintenance personnel of maintenance required on the tie-rod.

It is yet another object of the present invention to provide a load indicator apparatus that can be attached to the tie-rod to obtain a measurement to be displayed on a computer monitor or other display unit. This measurement can be used during the tightening process. The measurement can be used after the initial tightening to inspect for any changes in the initial strain condition of the tie-rod.

Set forth below are some of the advantages of the present invention:

1. The load indicator apparatus is suited for rugged applications.
2. The load indication provided by load indicator apparatus is highly accurate and repeatable.
3. The system is portable and can be used in the field to readily check and easily read the applied loads.
4. Real-time loading characteristics of the tie-rod loading can be monitored.
5. The readings from the load indicator apparatus can be integrated into a software platform for providing graphical insights and notifications to the user.

BRIEF DESCRIPTION OF THE DRAWINGS

The foregoing and other features and advantages of the invention will be more fully understood from the following descriptions of various embodiments of the invention and the accompanying drawings. In the drawings like reference numerals generally refer to similar elements throughout. The drawings are not necessarily to scale, emphasis instead being placed upon illustrating the principles of the invention.

DETAILED DESCRIPTION OF THE PREFERRED EMBODIMENTS

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. Thus, the following detailed description of the embodiments of the present invention is not intended to limit the scope of the invention, as claimed, but is presented for purposes of illustration only to describe the features and characteristics of the present invention, and to sufficiently enable one skilled in the art to practice the invention. Accordingly, the scope of the present invention is to be defined solely by the appended claims.

While described here in the example context of a tie-rod, it should be appreciated that the load indicator apparatus may be used with any shaft or strut, for example, rods, pipes and/or the like may incorporate aspects of the present invention. Thus, a tie-rod, as used herein, means any securing device or support structure capable of elongation in response to an applied force.

Figure 1:
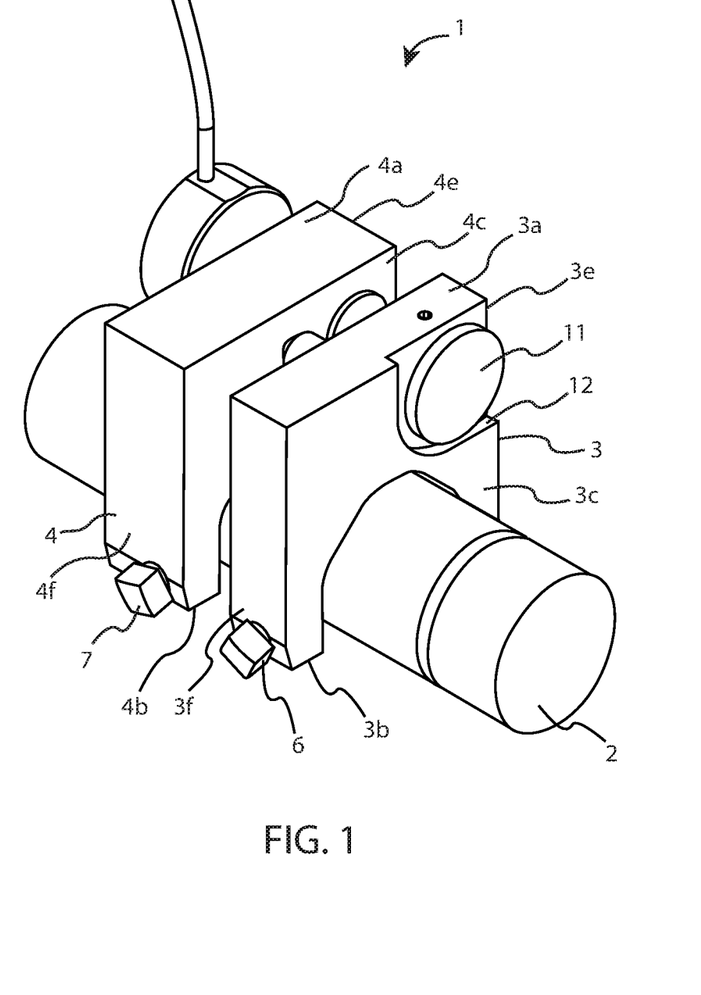
FIG. 1 is an isometric view of a load indicator apparatus affixed to a tie-rod according to one embodiment.

FIG. 1 shows a load indicator apparatus 1 attached externally to a tie-rod 2 for measuring the load on the tie-rod 2. Load indicator apparatus 1 is detachably mounted on tie-rod 2 and comprises a first reference fixture 3 attached at a first position on tie-rod 2 and a second fixture 4 attached at a second position on tie-rod 2. First reference fixture 3 is affixed to tie-rod 2 with the help of set screw 6 and second fixture 4 is affixed to tie-rod 2 with the help of set screw 7. When first reference fixture 3 is mounted on the exterior surface of tie-rod 2, the set screw 6 can be rotated to tighten the first reference fixture 3 along the cylindrical exterior surface of the tie-rod 2. Similarly, by rotating set screw 7, second fixture 4 can be tightened along the cylindrical exterior surface of tie-rod 2 after its installation. Varied degrees of tightness of first reference fixture 3 and second fixture 4 along tie-rod 2 can be achieved by rotation of set screws 6, 7 respectively. Although, the present invention discloses use of set screws 6, 7 for attaching first reference fixture 3 and second fixture 4 at the respective positions on tie-rod 2, other attachment means such as a magnet, snap fit, compression fit, cam, adhesive mechanisms known to a person skilled in the art may be used for affixing first reference fixture 3 and second fixture 4 to tie-rod 2.

Figure 2:
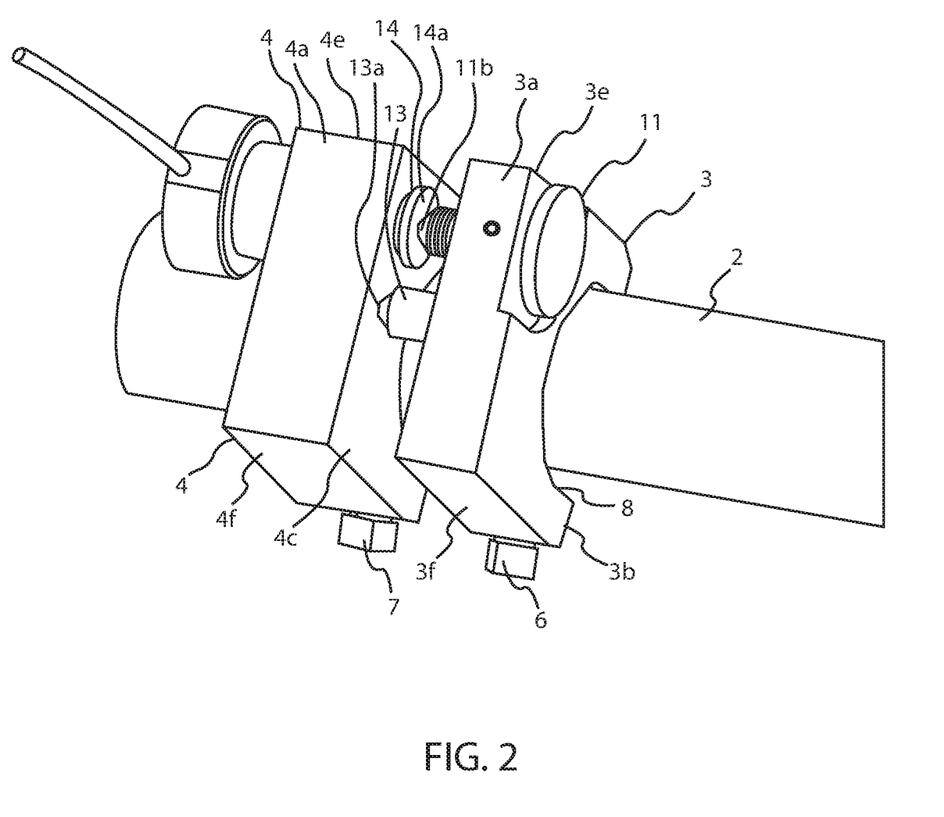
FIG. 2 is another perspective view of the load indicator apparatus of FIG. 1 showing the connection between the calibrator and the elongation gauge.
Figure 3:
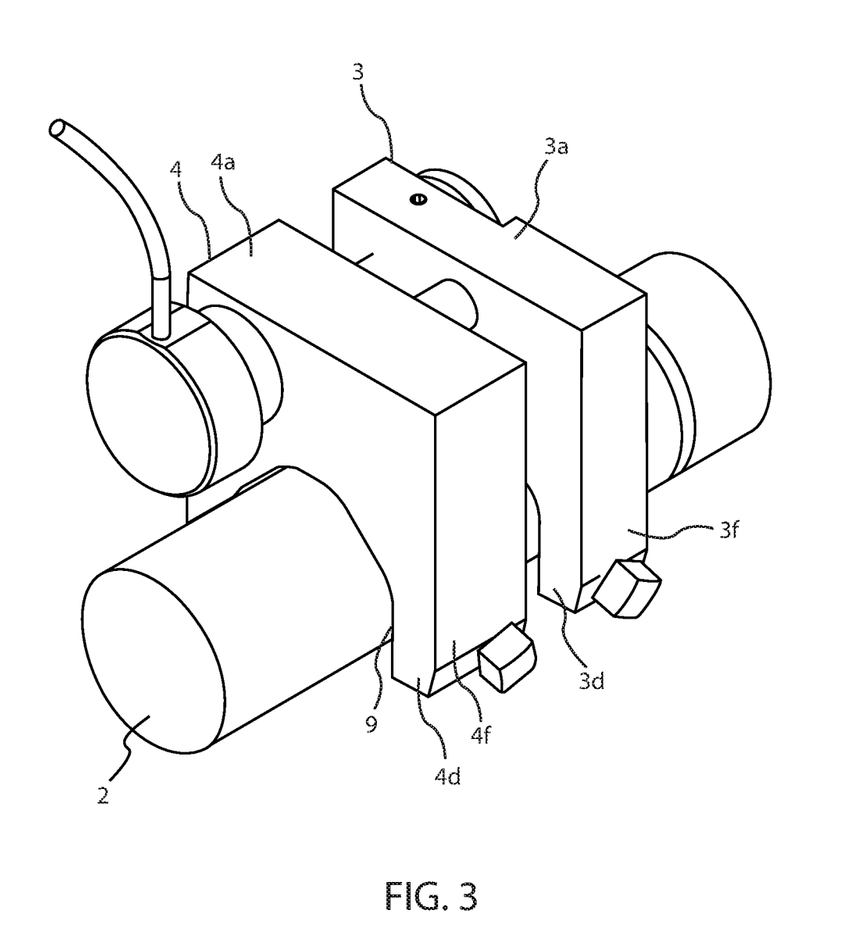
FIG. 3 is another perspective view similar to FIG. 1 showing the load indicator apparatus affixed to a tie-rod according to one embodiment.

Referring to FIG. 2 and FIG. 3, first reference fixture 3 and second fixture 4 include rigid bodies defining recess 8 formed in first reference fixture 3 and recess 9 formed in second fixture 4. Recess 8 partially engages tie-rod 2 and recess 9 partially engages tie-rod 2. Recesses 8 and 9 provide stable engagement respective first reference fixture 3 and second fixture 4 along the cylindrical exterior surface of tie-rod 2. In an alternate embodiment, any geometrical shape of recess 8 and recess 9 can be chosen according to the geometry of the tie-rod 2 exterior surface to provide a stable and tight-fit with first reference fixture 3 with tie-rod 2 and second fixture 4 with tie-rod 2.

In an embodiment of the invention, first reference fixture 3 and second fixture 4 may be made of detachable modular components. First reference fixture 3 and second fixture 4 can comprise detachable bases having locking mechanisms such as levers with detachable bases being adapted to be attached to different tie-rod diameters.

In another embodiment, one or more fixture adapters can be installed on first reference fixture 3 and/or on second fixture 4 to configure them to fit different tie-rod 2 diameters.

In another embodiment, load indicator apparatus 1 includes multiple different indexing interfaces for coupling to multiple different sized tie-rods. In some cases, one size of the load indicator apparatus 1 interface is usable on many different sizes of tie-rods to allow use of one load indicator apparatus on a wide range of tie-rod diameters.

Figure 4:
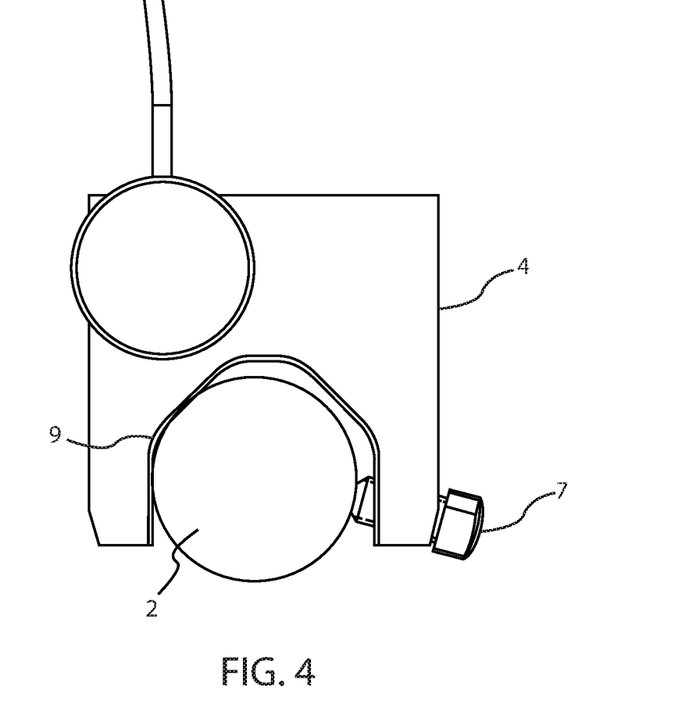
FIG. 4 is a front view of the load indicator apparatus showing the engagement of a channel recess of the second fixture engaging the cylindrical surface of the tie-rod and affixing the second fixture on the tie-rod by use of set-screw.

FIG. 4 shows a front view of load indicator apparatus 1 with second reference fixture 4 being attached to tie-rod 2. Recess 9 is defined in second fixture 4 for holding tie-rod 2 and mounting second fixture 4 on tie-rod 2. Recess 9 is designed to partially encompass tie-rod 2 and hold tie-rod 2 firmly in position. The exterior surface of tie-rod 2 contacts recess 9 so that second fixture 4 is firmly attached to tie-rod 2 with the help of set screw 7. By rotating set screw 7, second fixture 4 is tightened at the respective position on tie-rod 2. A through hole (not shown) is provided in second fixture 4 for passage of set screw 7 to make contact with tie-rod 2. It is preferred that the set screw 7 is fully tightened for firm and stable attachment of second fixture 4 and tie-rod 2.

In another embodiment of the invention, load indicator apparatus 1 includes cooperative releasably engageable features. In some cases, the attachment of load indicator apparatus 1 with tie-rod 2 includes a snap fit coupling. In some cases, the attachment of load indicator apparatus 1 with tie-rod 2 includes an interference-fit coupling. In some cases, the attachment of load indicator apparatus 1 with tie-rod 2 includes a threaded coupling. In some cases, the attachment of load indicator apparatus 1 with tie-rod 2 includes a seated coupling. In some cases, the attachment of load indicator apparatus 1 with tie-rod 2 includes a quick-connect coupling like those found on air tools. Any number or combination of couplings can be used to align and removably secure load indicator apparatus 1 with tie-rod 2.

Referring again to FIGS. 1-3, first reference fixture 3 defines a top surface 3a, bottom surface 3b, front surface 3c, back surface 3d, right surface 3e and left surface 3f. The second fixture 4 defines a top surface 4a, bottom surface 4b, front surface 4c, back surface 4d, right surface 4e and left surface 4f. A calibrator 11 is associated with first reference fixture 3 and is used for calibration purposes to be explained in more detail below. Calibrator 11 is disposed in a groove 12 defined on front surface 3c of first reference fixture 3.

Figure 5:
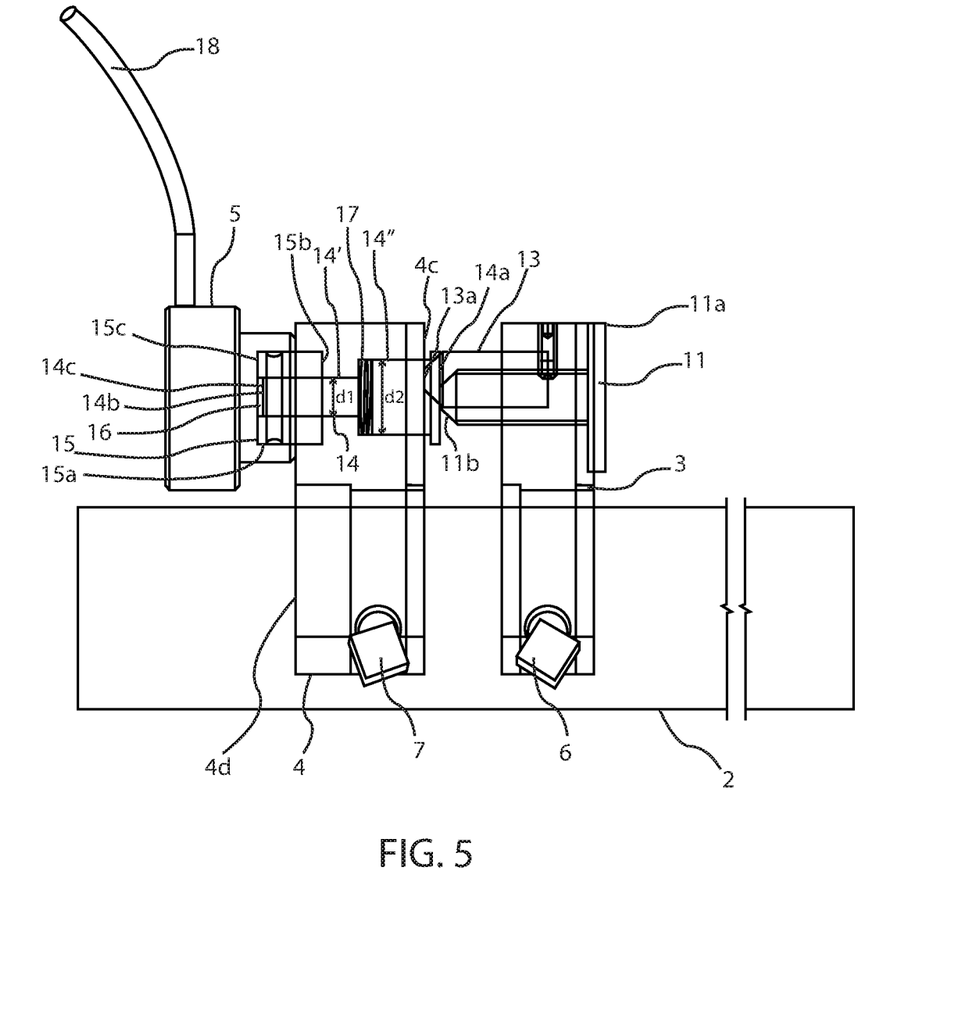
FIG. 5 is a side schematic diagram of the load indicator apparatus affixed to a tie-rod according to one embodiment.

As shown in FIG. 2 and FIG. 5, first reference fixture 3 includes a frame separation pin 13 that helps position first reference fixture 3 and second fixture 4 a fixed distance apart when installed on tie-rod 2. First reference fixture 3 and second fixture 4 are installed on tie-rod 2 in such a manner that the end 13a of the frame separation pin 13 touches front surface 4c of second fixture 4. Contact between the end 13a of frame separation pin 13 and front surface 4c of second fixture 4 provides the user an indication that first reference fixture 3 and second fixture 4 have been installed within a permissible distance range e.g. within calibration range.

As shown in FIG. 2 and FIG. 5, second fixture 4 includes an elongation gauge 14. Elongation gauge 14 extends between first reference fixture 3 and second fixture 4 and is configured to measure displacement of second fixture 4 relative to first reference fixture 3 during elongation of tie-rod 2. Elongation gauge 14 has a first end 14a and a second end 14b. First end 14a of elongation gauge 14 is in contact with the bottom end 11b of calibrator 11. Calibrator 11 may include a thumb screw extending from first reference fixture 3 and moveable into contact with first end 14a of elongation gauge 14. A gauge ring 15 is embedded in second fixture 4 and protrudes from back surface 4d of second fixture 4. Gauge ring 15 includes a front end 15a connected to a displacement transducer 5 and a back end 15b anchored in second fixture 4. Displacement transducer 5 is configured to generate an electrical signal proportionate to measured displacement of elongation gauge 14 during tie-rod 2 elongation. The front end 15a of gauge ring 15 has a circular surface acting as a gauge reference surface 15c.

In one embodiment, a cable 18 is connected to displacement transducer 5 for providing connection of displacement transducer 5 with a digital data logger or display (not shown). In another embodiment, the digital display can be a computer monitor or other display unit for providing a visual indication of the loading values to the user. In some embodiments, a wireless transponder may be used to transmit load data to a remote data logger or display.

In another embodiment, displacement transducer 5 can be replaced by a camera or laser system for load measuring purposes. A method for load calculation using a camera or a laser is disclosed in U.S. Pat. No. 6,204,771 B1, which is incorporated herein in its entirety by reference.

In another embodiment, the load measurements on tie-rod 2 may be performed using a lever indicator mechanism similar to methods disclosed in U.S. Pat. No. 8,024,979 B2, which is incorporated herein in its entirety by reference.

Elongation gauge 14 includes an elongation pin 14' and a gauge head 14". Elongation pin 14' and gauge head 14" have different cross-sectional areas wherein elongation pin 14' has diameter d1 and the gauge head 14" has diameter d2. Elongation pin 14' is moveable within a bore (not shown) within second fixture 4 and gauge head 14" is firmly anchored in second fixture 4. A spring 17 is positioned at the junction of the elongation pin 14' and gauge head 14". Spring 17 provides elongation gauge 14 an extended range of translation movement and helps elongation gauge 14 to maintain contact with calibrator 11 over a predetermined range of tie-rod 2 elongation under load conditions. Elongation pin 14' includes a front surface 14c facing gauge reference surface 15c of gauge ring 15.

Displacement transducer 5, which is used to measure the loading on tie-rod 2, works by measuring the capacitance of an air gap 16 formed between the front surface 14c of elongation pin 14' and gauge reference surface 15c. Under loading conditions, as tie-rod 2 elongates, first reference fixture 3 moves relative to second fixture 4 and air gap 16 is created with the proportional capacitance value of air gap 16 being measured by displacement transducer 5. The measurement of capacitance of air gap 16 formed between elongation gauge 14 and gauge reference surface 15c provides a measure of elongation of tie-rod 2. This value is sent to a load monitoring display (not shown) via cable 18 wherein the load monitoring unit (not shown) translates the measured capacitance by displacement transducer 5 into a visual load reading and an electronic load output value acting on tie-rod 2 is displayed to the user.

In another embodiment of the invention, air gap 16 can be additionally or alternatively measured using sonic, optical, or resistance measurements or other non-contact gap measuring techniques.

Referring to FIG. 2 and FIG. 5, the method of measuring tie-rod 2 load starts by installation of load indicator apparatus 1 along tie-rod 2 surface and calibrating load indicator apparatus 1 for accurate load measurements. The calibration is performed to check that front surface 14c of elongation pin 14' is aligned with gauge reference surface 15c. Tie-rod 2 for which the load is to be measured can be in an installed state in a structure or the load measuring process can be carried out in a workshop for testing the loading capacity of tie-rod 2. Thus, load indicator apparatus 1 may be used during installation or routine maintenance of tie-rods to measure the tensile load of tie-rod 2.

The initial set up involves affixing first reference fixture 3 at a first position on tie-rod 2 and affixing second reference fixture 4 at a second position on tie-rod 2. First reference fixture 3 is tightened on tie-rod 2 by rotation of set screw 6 and second fixture 4 is tightened on tie-rod 2 by rotation of set screw 7. First reference fixture 3 and second fixture 4 are spaced a predetermined/permissible distance apart such that end 13a of frame separation pin 13 contacts front surface 4c of second fixture 4.

In another embodiment, to check the proper distance range between first reference fixture 3 and second fixture 4, a gauge block can be used to measure the accurate spacing between first reference fixture 3 and second fixture 4.

The calibration process of elongation gauge 14 extending between first reference fixture 3 and second fixture 4 is then performed. Displacement transducer 5 is connected to gauge ring 15 and connected via cable 18 to a load monitoring display (not shown). Calibrator 11 which is configured for calibrating elongation gauge 14 to an initial load setting is rotated along head 11a. With rotation of head 11a, bottom end 11b of calibrator 11 advances towards first end 14a of elongation gauge 14. Head 11a of calibrator 11 is rotated until the bottom end 11b of calibrator 11 pushes elongation gauge 14 by contacting its first end 14a. This push force acting on second fixture 4 along elongation gauge 14 is detected by displacement transducer 5 and displayed on the load monitoring unit (not shown) as the initial tie-rod load. The display of the initial tie-rod load value on the load monitoring unit (not shown) indicates that front surface 14c of elongation pin 14' is aligned with gauge reference surface 15c of gauge ring 15. The initial tie-rod load is set to zero on the load monitor to complete the calibration process. Load indicator apparatus 1 is calibrated to recognize the load scale from zero to proof load of tie-rod 2 material and indicates load induced into tie-rod 2. The calibration step also ensures that load indicator apparatus 1 is properly installed and can be used to measure loads acting on tie-rod 2.

When first reference fixture 3 moves relative to second fixture 4 during elongation of tie-rod 2 subjected to load conditions, spring loaded elongation pin 14' of elongation gauge 14 moves relative to second fixture 4 and an air gap 16 is formed between front surface 14c of elongation pin 14' and gauge reference surface 15c. As elongation pin 14' of elongation gauge 14 is moveable within a bore (not shown) in second fixture 4, any slight loading on tie-rod 2 results in the movement of elongation pin 14'. This air gap 16 is used for load detection on tie-rod 2 by measuring the capacitance of air gap 16 formed between front surface 14c of elongation pin 14' and a gauge reference surface 15c during elongation of tie-rod 2. The measurement of the air gap 16 capacitance is performed by using displacement transducer 5 and applied load on tie-rod 2 is displayed on the load monitoring unit (not shown). Displacement transducer 5 is configured to generate an electrical signal proportionate to measured displacement of elongation gauge 14 during elongation of tie-rod 2. Displacement transducer 5 translates the measured capacitance into a visual load reading device via electric cable 18 and an electronic load output value is displayed on the load monitoring unit.

In another embodiment, the load display is at least one of an electrical signal, an audible signal and a light signal.

In another embodiment, load indicator apparatus 1 is further configured to maintain a measured load value on the load monitoring unit after removal of load indicator apparatus 1 from tie-rod 2.

In another embodiment, a mechanical probe or any other sensing devices can be affixed to second fixture 4 to measure the load applied on tie-rod 2.

In another embodiment, the electronic load output value displayed on the load monitoring unit can be wirelessly communicated to a remote receiver for further analysis of the loading acting on tie-rod 2.

In another embodiment, a removable load reader can be attached to elongation gauge 14 for instantaneous loading measurement of tie-rod 2. The load reader can be affixed relative to elongation gauge 14 for continuous real-time or periodic reading of tie-rod loading.

Load indicator apparatus 1 of the present invention is compact and provides precise measurements of the load acting on tie-rod 2. With the use of displacement transducer 5 which measures the capacitance of air gap 16 formed between elongation gauge 14 and gauge reference surface 15c to provide a measure of elongation of tie-rod 2, the load readings are precise and accurate. The initial installation of load indicator apparatus 1 is easy and can be done quickly by the user. Load indicator apparatus 1 is preferably portable and lightweight which increases its adaptability in different industrial environments.

In another embodiment of the invention, the measurements detected by load indicator apparatus 1 can be used to shut-off a tightening tool applying load on tie-rod 2 when the load on tie-rod 2 reaches its specified loading limit.

Load indicator apparatus 1 also makes it possible to monitor real-time loading of tie-rod 2. The readings from load indicator apparatus 1 can be integrated into a software platform for automatically providing notifications to maintenance personnel for maintenance required of tie-rod 2. Such notifications can also include information about the failure of tie-rod 2 when subjected to different loadings. The current working state of tie-rod 2 and the failure of tie-rod 2 can be predicted with precision using load indicator apparatus 1.

It is possible for the present invention to give a highly accurate indication of the applied loads on tie-rod 2. The indication from load indicator apparatus 1 enables a person to see readily what the applied loading on tie-rod 2 is. This can be from a portable battery-operated monitor/display, which may be hand held and connected to load indicator apparatus 1 by a wired connector.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A tie-rod load indicator comprising: a first reference fixture configured for attachment at a first position on a tie-rod; a second fixture configured for attachment at a second position on the tie-rod; and an elongation gauge extending between the first reference fixture and the second fixture and configured to measure displacement of the second fixture relative to the first reference fixture during elongation of the tie-rod.

2. The tie-rod indicator of claim 1, wherein the second fixture comprises a gauge reference surface and wherein measurement of capacitance of an air gap formed between the elongation gauge and the gauge reference surface provides a measure of elongation of the tie-rod.

3. The tie-rod indicator of claim 1, further comprising a reader for translating a measured capacitance into at least one of a visual load reading and an electronic load output value.

4. The tie-rod indicator of claim 3, further comprising a wireless transponder for communicating the electronic load output value to a remote receiver.

5. The tie-rod indicator of claim 1, wherein at least one of the first reference fixture and the second fixture is configured for attachment to the tie-rod via at least one of a magnet, set screw, snap fit, compression fit, cam, and adhesive.

6. The tie-rod indicator of claim 1, further comprising a calibrator configured for calibrating the elongation gauge to an initial load setting corresponding to an initial tie-rod load.

7. The tie-rod indicator of claim 6, wherein the calibrator comprises a thumb screw extending from the first reference fixture and moveable into contact with the elongation gauge.

8. The tie-rod indicator of claim 7, wherein the elongation gauge is spring loaded to maintain contact with the thumb screw over a predetermined range of tie-rod elongation.

9. The tie-rod indicator of claim 7, further comprising a displacement transducer configured to generate an electrical signal proportionate to measured displacement of the elongation gauge during tie-rod elongation.

10. A method for measuring loading of a tie-rod comprising: affixing a first reference fixture at a first position on the tie-rod; affixing a second fixture at a second position on the tie-rod; calibrating an elongation gauge extending between the first reference fixture and the second fixture; and using the elongation gauge to measure displacement of the second fixture relative to the first reference fixture as a measure of loading of the tie-rod.

11. The method of claim 10, wherein the calibrating comprising adjusting a calibrator supported by one of the fixtures to provide an initial tie-rod load setting.

12. The method of claim 10, wherein using the elongation gauge to measure displacement comprises measuring capacitance of an air gap formed between the elongation gauge and a reference surface during elongation of the tie-rod.

13. The method of claim 12, further comprising translating measured capacitance into at least one of a visual load reading and an electronic load output value.

14. The method of claim 13, further comprising wirelessly communicating the electronic load output value to a remote receiver.

15. The method of claim 10, wherein affixing the first reference fixture and the second fixture to the tie-rod includes use of at least one of a magnet, set screw, snap fit, compression fit, cam, and adhesive.

16. The method of claim 10, further comprising attaching a removable load reader to the elongation gauge for instantaneous loading measurement.

17. The method of claim 10, further comprising affixing a load reader relative to the elongation gauge for continuous real-time or periodic reading of tie-rod loading.

18. The method of claim 10, further comprising using the measure of loading of the tie-rod to shut-off a tightening tool.

19. The method of claim 10, further comprising monitoring the real-time loading of the tie-rod and automatically providing notification to maintenance personnel of at last one of maintenance required, predicted failure and actual failure of the tie-rod.

\* \* \* \* \*